(12) United States Patent
Laumen et al.

(10) Patent No.: US 8,099,081 B2
(45) Date of Patent: Jan. 17, 2012

(54) METHOD AND MOBILE TELECOMMUNICATIONS DEVICE FOR TRANSMITTING DATA IN A MOBILE RADIO NETWORK

(75) Inventors: Josef Laumen, Hildesheim (DE); Andreas Schmidt, Braunschweig (DE); Markus Trauberg, Velchede (DE)

(73) Assignee: Siemens Aktiengesellschaft, Munich (DE)

( * ) Notice: Subject to any disclaimer, the term of this patent is extended or adjusted under 35 U.S.C. 154(b) by 746 days.

(21) Appl. No.: 10/466,749

(22) PCT Filed: Dec. 12, 2001

(86) PCT No.: PCT/EP01/14617
§ 371 (c)(1),
(2), (4) Date: Jul. 16, 2003

(87) PCT Pub. No.: WO02/058359
PCT Pub. Date: Jul. 25, 2002

(65) Prior Publication Data
US 2004/0097248 A1 May 20, 2004

(30) Foreign Application Priority Data

Jan. 18, 2001 (EP) .................................... 01101057
Jan. 31, 2001 (EP) .................................... 01102229
Mar. 23, 2001 (EP) .................................... 01107278

(51) Int. Cl.
*H04L 12/58* (2006.01)
*H04M 1/725* (2006.01)
*H04W 4/00* (2009.01)

(52) U.S. Cl. .................. 455/412.1; 455/414.1; 455/466
(58) Field of Classification Search ............... 455/412.1, 455/414.1, 466
See application file for complete search history.

(56) References Cited

U.S. PATENT DOCUMENTS

| | | | | |
|---|---|---|---|---|
| 5,724,412 A | * | 3/1998 | Srinivasan | 379/93.23 |
| 5,850,511 A | * | 12/1998 | Stoecker et al. | 714/38 |
| 5,987,100 A | * | 11/1999 | Fortman et al. | 379/88.14 |
| 6,018,744 A | * | 1/2000 | Mamiya et al. | 707/104.1 |
| 6,647,409 B1 | * | 11/2003 | Sherman et al. | 709/203 |
| 6,865,609 B1 | * | 3/2005 | Gubbi et al. | 709/230 |
| 7,039,678 B1 | * | 5/2006 | Halahmi et al. | 709/206 |
| 2001/0012286 A1 | * | 8/2001 | Huna et al. | 370/352 |
| 2001/0034767 A1 | * | 10/2001 | Aho | 709/206 |
| 2002/0013854 A1 | * | 1/2002 | Eggleston et al. | 709/234 |
| 2002/0073058 A1 | * | 6/2002 | Kremer et al. | 707/1 |

FOREIGN PATENT DOCUMENTS

| | | |
|---|---|---|
| WO | 9966746 A2 | 12/1999 |
| WO | WO 00/64110 | 10/2000 |
| WO | WO 0064110 A1 | 10/2000 |
| WO | 0133782 A1 | 5/2001 |

OTHER PUBLICATIONS

XP-000726939 "MHEGAM-A Multimedia Messaging System", Kervella et al, pp. 22-29.

(Continued)

*Primary Examiner* — Patrick Edouard
*Assistant Examiner* — Matthew Genack
(74) *Attorney, Agent, or Firm* — King & Spalding L.L.P.

(57) ABSTRACT

The present invention relates to a transmission of data in a mobile radio network, in particular a transmission of text and/or image data, with or without sound in multimedia messages, wherein at least one identification signal for a data record or several records is allocated to the data and the identification signal(s) is/are transmitted to the receiver of the data.

31 Claims, 21 Drawing Sheets

M-Notification.ind an einen "To-Empfänger":

X-Mms-Message-Type: m-notification-ind
X-Mms-Transaction-ID: TRANSACTION-ID#2
X-Mms-Version: 1.0
From: markus.trauberg@t-online.de
X-Mms-Message-Class: Personal
X-Mms-Message-Size: XXX (Attachments + Header)
X-Mms-Expiry: 3600
X-Mms-Content-Location: www.sal.siemens.de/mms-inbox/ABCD.1234
Subject: Urlaubsgruesse aus Spiekeroog
X-Mms-Content-ID: <000714.1412.1markus.trauberg>
Content-Type: text/plain
X-Mms-Content-Name: "Urlaubsgruesse.txt"
X-Mms-Content-Size: 212
X-Mms-External-Link-Flag: Yes
X-Mms-External-Link-Size: 8245
X-Mms-Content-ID: <000714.1412.2markus.trauberg>
Content-Type: image/jpeg
X-Mms-Content-Name: "unser Ferienhaus.jpg"
X-Mms-Content-Size: 1265
X-Mms-Content-ID: <000714.1412.3markus.trauberg>
Content-Type: presentation_description/smil
X-Mms-Content-Name: "Spiekeroog.smi"
X-Mms-Content-Size: 588
X-Mms-Content-Related-ID: <000714.1412.2markus.trauberg>
X-Mms-Content-Related-ID: <000714.1412.4markus.trauberg>
X-Mms-Content-Related-ID: <000714.1412.5markus.trauberg>
X-Mms-Content-ID: <000714.1412.4markus.trauberg>
Content-Type: audio/mp3
X-Mms-Content-Name: "Meeresrauschen .mp3"
X-Mms-Content-Size: 82345
X-Mms-Content-ID: <000714.1412.5markus.trauberg>
Content-Type: video/mpeg4
X-Mms-Content-Name: "Inselbahn .mpg"
X-Mms-Content-Size: 632564

OTHER PUBLICATIONS

XP-002170350 MIME (Multipurpose Internet Mail Extensions) Part One: Mechanisms for Specifying and Describing the Format of Internet Message Bodies.

"The Berkom multimedia-mail teleservice", Moeller et al, pp. 89-102.

AT&T Wireless Services, Content-Type Information Into the Notification Request, T2M010026, 3GPP, Jan. 8, 2001, URL (1 page), Jan. 8, 2001.

* cited by examiner

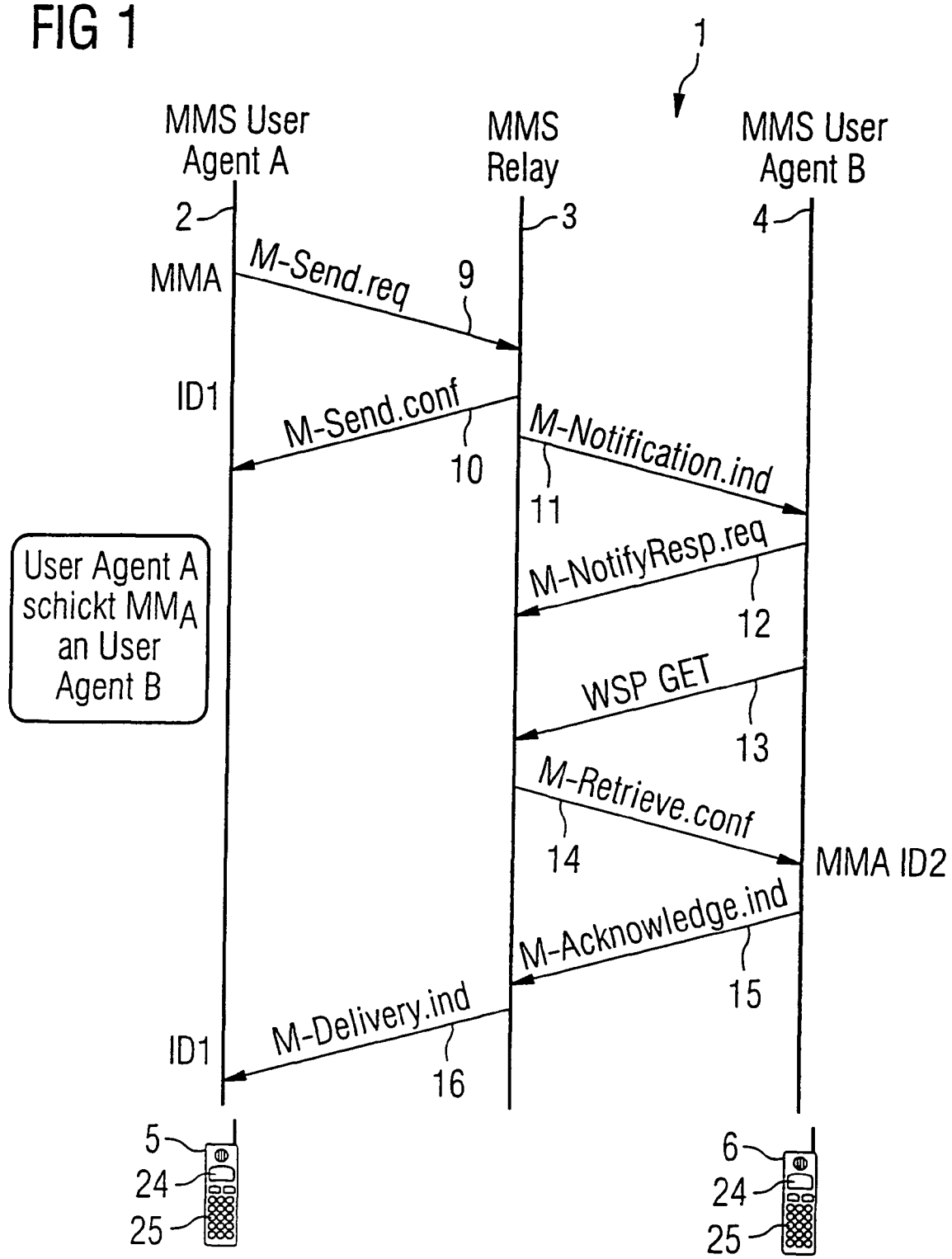

FIG 2

| Name | Inhalt | Bemerkungen |
|---|---|---|
| X-Mms-Message-Type | Siehe Stand der Technik | Siehe Stand der Technik |
| X-Mms-Transaction-ID | | |
| X-Mms-MMS-Version | | |
| Date | | |
| From | | |
| To | | |
| Cc | | |
| Bcc | | |
| Subject | | |
| X-Mms-Message-Class | | |
| X-Mms-Expiry | | |
| X-Mms-Delivery-Time | | |
| X-Mms-Priority | | |
| X-Mms-Content-ID | Content-IDentifier = CI | Optional: Dieses Feld definiert die Lokalisierung des MM-Elements 7 |
| X-Mms-Content-Type | Content-type-value = CTV | Optional: Spezifiziert den Inhaltstyp des MM-Elements 7 |
| X-Mms-Content-Size | Content-size-value = CSV | Optional: Gesamtgröße des MM-Elements in Octets |
| X-Mms-Content-Name | Content-name = CNV | Optional: Name des MM-Elements 7 |
| X-Mms-Content-Related-URI | Location-value = LV | Optional: Definiert die Lokalisierung eines anderen MM-Elements, auf das das beschriebene MM-Element 7 bezogen ist |
| X-Mms-External-Link-Flag | External-Link-Flag = ELF | Optional: Zeigt an, wenn die MM oder eine seiner MM-Elemente einen Link zu einem Element außerhalb der gesamten MM enthält |
| X-Mms-External-Link-Size | External-Link-Size = ELS | Optional: Gesamtgröße des gelinkten externen Elements in Octets |

FIG 3

172 — X-Mms-Content-ID (0x80):
    CI = Text-string (Textzeichen)

182 — X-Mms-Content-Type (0x81):
    CTV = short-integer (ganze Zahl)

192 — X-Mms-Content-Size (0x82):
    CSV = short-integer (ganze Zahl)

202 — X-Mms-Content-Name (0x83):
    CN = Text-string (Textzeichen)

212 — X-Mms-Content-Related-URI (0x84):
    CRV = Text-string (Textzeichen)

222 — X-Mms-External-Link-Flag (0x85):
    ELF = Yes | No (Ja/Nein)
    Yes = <Octet 128>
    No = <Octet 129>

232 — X-Mms-External-Link-Size(0x86):
    ELS = short-integer (ganze Zahl)

X-Mms-Status (0x14):
    Status-Value = Expired | Retrieved | Rejected | Deferred | Partly-retrieved Expired = <Octet 128>
    Retrieved = <Octet 129>
    Rejected = <Octet 130>
    Deferred = <Octet 131>
    Partly-retrieved = <Octet 132>

FIG 4

| Name | Zugew. Nummer | laufende Nummer | Bemerkung |
|---|---|---|---|
| Bcc | 0x01 | 1 | |
| Cc | 0x02 | 2 | |
| X-Mms-Content-Location | 0x03 | 3 | |
| Content-Type | 0x04 | 4 | |
| Date | 0x05 | 5 | |
| X-Mms-Delivery-Report | 0x06 | 6 | |
| X-Mms-Delivery-Time | 0x07 | 7 | |
| X-Mms-Expiry | 0x08 | 8 | (Stand der Technik) |
| From | 0x09 | 9 | |
| X-Mms-Message-Class | 0x0A | 10 | |
| Message-ID | 0x0B | 11 | |
| X-Mms-Message-Type | 0x0C | 12 | |
| X-Mms-MMS-Version | 0x0D | 13 | |
| X-Mms-Message-Size | 0x0E | 14 | |
| X-Mms-Priority | 0x0F | 15 | |
| X-Mms-Read-Reply | 0x10 | 16 | |
| X-Mms-Report-Allowed | 0x11 | 17 | |
| X-Mms-Response-Status | 0x12 | 18 | |
| X-Mms-Sender-Visibility | 0x13 | 19 | |
| X-Mms-Status | 0x14 | 20 | |
| Subject | 0x15 | 21 | |
| To | 0x16 | 22 | |
| X-Mms-Transaction-id | 0x17 | 23 | |
| ... | ... | ... | |
| 17—X-Mms-Content-ID | 0x80 | 27 | Optional: Dieses Feld definiert die Lokalisierung des MM-Elements |
| 18—X-Mms-Content-Type | 0x81 | 28 | Optional: Spezifiziert den Inhaltstyp des MM-Elements |
| 19—X-Mms-Content-Size | 0x82 | 29 | Optional: Gesamtgröße des MM-Elements in Octets |
| 20—X-Mms-Content-Name | 0x83 | 30 | Optional: Name des MM-Elements in Octets |
| 21—X-Mms-Content-Related-URI | 0x84 | 31 | Optional: Definiert die Lokalisierung eines anderen MM-Elements auf das das beschriebene MM-Element bezogen ist |
| 22—X-Mms-External-Link-Flag | 0x85 | 32 | Optional: Zeigt an, wenn die MM oder eine seiner MM-Elemente einen Link zu einem Element außerhalb der gesamten MM enthält |
| 23—X-Mms-External-Link-Size | 0x86 | 33 | Optional: Gesamtgröße des gelinkten externen Elements in Octets |

FIG 5  MNI

| Name | Inhalt | Bemerkungen |
|---|---|---|
| X-Mms-Message-Type | gemäß WAP-Standard | Stand der Technik |
| X-Mms-Transaction-ID | | |
| X-Mms-MMS-Version | | |
| From | | |
| X-Mms-Content-ID | Content-IDentifier = CI | Optional: Dieses Feld definiert die Lokalisierung des MM-Elements |
| X-Mms-Content-Type | Content-type-value = CTV | Optional: Spezifiziert den Inhaltstyp des MM-Elements |
| X-Mms-Content-Size | Content-size-value = CSV | Optional: Gesamtgröße des MM-Elements in Octets |
| X-Mms-Content-Name | Content-name = CNV | Optional: Name des MM-Elements |
| X-Mms-Content-Related-URI | Location-value = LV | Optional: Definiert die Lokalisierung eines anderen MM-Elements auf das das beschriebene MM-Element bezogen ist |
| X-Mms-External-Link-Flag | External-Link-Flag = ELF | Optional: Zeigt an, wenn die MM oder eine seiner MM-Elemente einen Link zu einem Element außerhalb der gesamten MM enthält |
| X-Mms-External-Link-Size | External-Link-Size = ELS | Optional: Gesamtgröße des gelinkten externen Elements in Octets |
| X-Mms-Message-Class | gemäß WAP-Standard | Stand der Technik |
| X-Mms-Message-Size | | |
| X-Mms-Expiry | | |
| X-Mms-Content-Location | | |

Labels: 17, 18, 19, 20, 21, 22, 23

FIG 6 MRC

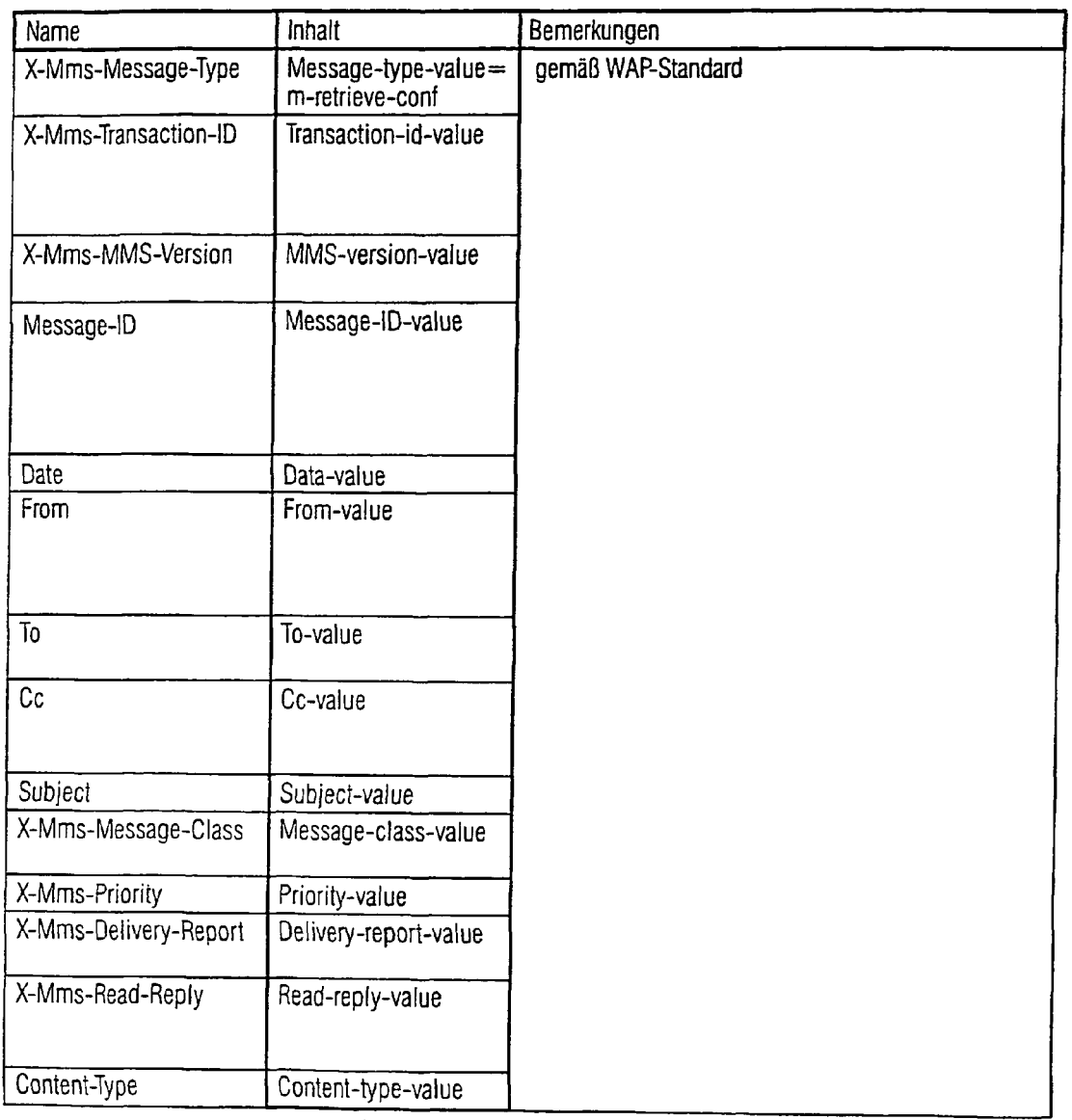

| Name | Inhalt | Bemerkungen |
|---|---|---|
| X-Mms-Message-Type | Message-type-value= m-retrieve-conf | gemäß WAP-Standard |
| X-Mms-Transaction-ID | Transaction-id-value | |
| X-Mms-MMS-Version | MMS-version-value | |
| Message-ID | Message-ID-value | |
| Date | Data-value | |
| From | From-value | |
| To | To-value | |
| Cc | Cc-value | |
| Subject | Subject-value | |
| X-Mms-Message-Class | Message-class-value | |
| X-Mms-Priority | Priority-value | |
| X-Mms-Delivery-Report | Delivery-report-value | |
| X-Mms-Read-Reply | Read-reply-value | |
| Content-Type | Content-type-value | | gemäß WAP-Standard

FIG 7  MAI

| Name | Inhalt | Bemerkungen |
|---|---|---|
| X-Mms-Message-Type | Message-type-value = m-acknowledge-ind | Stand der Technik |
| X-Mms-Transaction-ID | Transaction-id-value | |
| X-Mms-MMS-Version | MMS-version-value | |
| X-Mms-Report-Allowed | report-allowed-value | | gemäß WAP-Standard

FIG 8  MDI

| Name | Inhalt | Bemerkungen |
|---|---|---|
| X-Mms-Message-Type | Message-type-value = m-delivery-ind | Stand der Technik |
| X-Mms-MMS-Version | MMS-version-value | |
| X-Mms-Message-ID | Message-ID-value | |
| To | To-value | |
| Date | Date-value | |
| X-Mms-Status | Status-value | |

FIG 9

M-Send.req (MMS User Agent A → MMS Relay):
X-Mms-Message-Type: m-send-req
X-Mms-Transaction-ID: TRANSACTION-ID#1
X-Mms-Version: 1.0
Date: Fri, 14 Jul 2000 14:12:19 +0100
From: markus.trauberg@t-online.de
To: andreas.schmidt@sal.siemens.de
To: josef.laumen@sal.siemens.de
Subject: Urlaubsgruesse aus Spiekeroog
X-Mms-Delivery-Report: Yes
X-Mms-Content-ID: <000714.1412.1markus.trauberg >
X-Mms-Content-Name: "Urlaubsgruesse.txt"
X-Mms-External-Link-Flag: Yes
X-Mms-External-Link-Size: 8245
X-Mms-Content-ID: <000714.1412.2markus.trauberg >
X-Mms-Content-Name: "unser Ferienhaus.jpg"
X-Mms-Content-ID: <000714.1412.3markus.trauberg >
X-Mms-Content-Name: "Spiekeroog.smi"
X-Mms-Content-Related-ID: <000714.1412.2markus.trauberg >
X-Mms-Content-Related-ID: <000714.1412.4markus.trauberg >
X-Mms-Content-Related-ID: <000714.1412.5markus.trauberg >
X-Mms-Content-ID: <000714.1412.4markus.trauberg >
X-Mms-Content-Name: "Meeresrauschen .mp3"
X-Mms-Content-ID: <000714.1412.5markus.trauberg >
X-Mms-Content-Name: "Inselbahn .mpg"
Content-Type: Application/vnd.wap.multipart.related
Start: <000714.1412.3.markus.trauberg >
nEntries: 5
HeadersLen: XX
DataLen: XX
Content-Type: text/plain;
X-Mms-Content-ID: <000714.1412.1markus.trauberg >
Liebe Kollegen, Schöne Grüße aus dem Urlaub. Spiekeroog ist mal wieder ganz bezaubernd.

Falls ihr auf den Geschmack kommt, findet ihr hier mehr Info: http://www.spiekeroog.de Viel Spaß noch bei der Arbeit ;-)

MfG

Markus
HeadersLen: XX
DataLen: 1265
Content-Type: image/jpeg
X-Mms-Content-ID: <000714.1412.2markus.trauberg >
...
HeadersLen: XX
DataLen: 588
Content-Type: presentation_description/smil,
X-Mms-Content-ID: <000714.1412.3markus.trauberg >
...
HeadersLen: XX
DataLen: 82345
Content-Type: audio/mp3,
X-Mms-Content-ID: <000714.1412.4markus.trauberg >
...
HeadersLen: XX
DataLen: 632564
Content-Type: video/mpeg4
X-Mms-Content-ID: <000714.1412.5markus.trauberg >

FIG 10

M-Send.conf (MMS Relay → MMS User Agent A) :

X-Mms-Message-Type: m-send-conf
   X-Mms-Transaction-ID: TRANSACTION-ID#1
   X-Mms-Version: 1.0
   X-Mms-Message-ID: MESSAGE-ID#1
   X-Mms-Response-Status: ok

FIG 11

M-Notification.ind an einen "To-Empfänger":

X-Mms-Message-Type: m-notification-ind
    X-Mms-Transaction-ID: TRANSACTION-ID#2
    X-Mms-Version: 1.0
    From: markus.trauberg@t-online.de
    X-Mms-Message-Class: Personal
    X-Mms-Message-Size: XXX (Attachments + Header)
    X-Mms-Expiry: 3600
    X-Mms-Content-Location: www.sal.siemens.de/mms-inbox/ABCD.1234
    Subject: Urlaubsgruesse aus Spiekeroog
    X-Mms-Content-ID: <000714.1412.1markus.trauberg >
    Content-Type: text/plain
    X-Mms-Content-Name: "Urlaubsgruesse.txt"
    X-Mms-Content-Size: 212
    X-Mms-External-Link-Flag: Yes
    X-Mms-External-Link-Size: 8245
    X-Mms-Content-ID: <000714.1412.2markus.trauberg >
    Content-Type: image/jpeg
    X-Mms-Content-Name: "unser Ferienhaus.jpg"
    X-Mms-Content-Size: 1265
    X-Mms-Content-ID: <000714.1412.3markus.trauberg >
    Content-Type: presentation_description/smil
    X-Mms-Content-Name: "Spiekeroog.smi"
    X-Mms-Content-Size: 588
    X-Mms-Content-Related-ID: <000714.1412.2markus.trauberg >
    X-Mms-Content-Related-ID: <000714.1412.4markus.trauberg >
    X-Mms-Content-Related-ID: <000714.1412.5markus.trauberg >
    X-Mms-Content-ID: <000714.1412.4markus.trauberg >
    Content-Type: audio/mp3
    X-Mms-Content-Name: "Meeresrauschen .mp3"
    X-Mms-Content-Size: 82345
    X-Mms-Content-ID: <000714.1412.5markus.trauberg >
    Content-Type: video/mpeg4
    X-Mms-Content-Name: "Inselbahn .mpg"
    X-Mms-Content-Size; 632564

FIG 12

M-Retrieve.conf (MMS Relay → MMS User Agent B):

X-Mms-Message-Type: m-retrieve-conf
    X-Mms-Transaction-ID: TRANSACTION-ID#3
    X-Mms-Version: 1.0
    Date: Fri, 14 Jul 2000 14:12:19 +0100
    From: markus.trauberg@t-online.de
    To: andreas.schmidt@sal.siemens.de
    To: josef.laumen@sal.siemens.de
    X-Mms-Message-ID: MESSAGE-ID#1
    X-Mms-Delivery-Report: Yes
    Subject: Urlaubsgruesse aus Spiekeroog
    Content-Type: Application/vnd.wap.mulitpart.related
    Start: <000714.1412.3markus.trauberg >
    nEntries: 5
    HeadersLen: XX
    DataLen: XX
    Content-Type: text/plain;
    X-Mms-Content-ID: <000714.1412.1markus.trauberg >
    X-Mms-Content-Name: "Urlaubsgruesse.txt"
    Liebe Kollegen, Schöne Grüße aus dem Urlaub. Spiekeroog ist mal wieder ganz bezaubernd.

Falls ihr auf den Geschmack kommt, findet ihr hier mehr Info:
http://www.spiekeroog.de Viel Spaß noch bei der Arbeit ;-)

MfG

Markus
    HeadersLen: XX
    DataLen: 1265
    Content-Type: image/jpeg
    X-Mms-Content-Name: "unser Ferienhaus.jpg"
    X-Mms-Content-ID: <000714.1412.2markus.trauberg >

...
    HeadersLen: XX
    DataLen: 588
    Content-Type: presentation_description/smil,
    X-Mms-Content-Name: "Spiekeroog.smi"
    X-Mms-Content-ID: <000714.1412.3markus.trauberg >

...
    HeadersLen: XX
    DataLen: 82345
    Content-Type: audio/mp3,
    X-Mms-Content-Name: "Meeresrauschen .mp3"
    X-Mms-Content-ID: <000714.1412.4markus.trauberg >

...
    HeadersLen: XX
    DataLen: 632564
    Content-Type: video/mpeg4
    X-Mms-Content-Name: "Inselbahn .mpg"
    X-Mms-Content-ID: <000714.1412.5markus.trauberg >

FIG 13

M-Acknowledge.ind (MMS User Agent B → MMS Relay) :

X-Mms-Message-Type: m-acknowledge-ind
X-Mms-Transaction-ID: TRANSACTION-ID#3
X-Mms-Version: 1.0
X-Mms-Report-Allowed: Yes

FIG 14

M-Delivery.ind (MMS Relay → MMS User Agent A) :

X-Mms-Message-Type: m-delivery-ind
X-Mms-Transaction-ID: MESSAGE-ID#1
X-Mms-Version: 1.0
To: andreas.schmidt@sal.siemens.de
Date: Fri, 14 Jul 2000 16:45:00 +0100
X-Mms-Status: Retrieved

FIG 15

M-Retrieve.conf (MMS Relay → MMS User Agent B):

X-Mms-Message-Type: m-retrieve-conf
X-Mms-Transaction-ID: TRANSACTION-ID#4
X-Mms-Version: 1.0
Date: Fri, 14 Jul 2000 14:12:19 +0100
From: markus.trauberg@t-online.de
To: andreas.schmidt@sal.siemens.de
To: josef.laumen@sal.siemens.de
X-Mms-Message-ID: MESSAGE-ID#1
X-Mms-Delivery-Report: Yes
Subject: Urlaubsgruesse aus Spiekeroog
Content-Type: Application/vnd.wap.mulitpart.related
Start: <000714.1412.3markus.trauberg >
nEntries: 1
HeadersLen: XX
DataLen: XX
Content-Type: text/plain;
X-Mms-Content-ID: <000714.1412.1markus.trauberg >
X-Mms-Content-Name: "Urlaubsgruesse.txt"
Liebe Kollegen, Schöne Grüße aus dem Urlaub. Spiekeroog ist mal wieder ganz bezaubernd.

Falls ihr auf den Geschmack kommt, findet ihr hier mehr Info: http://www.spiekeroog.de Viel Spaß noch bei der Arbeit ;-)

MfG

Markus

FIG 16

M-Acknowledge.ind (MMS User Agent B → MMS Relay) :

X-Mms-Message-Type: m-acknowledge-ind
X-Mms-Transaction-ID: TRANSACTION-ID#4
X-Mms-Version: 1.0
X-Mms-Report-Allowed: Yes

FIG 17

M-Delivery.ind (MMS Relay → MMS User Agent A) :

X-Mms-Message-Type: m-delivery-ind
X-Mms-Transaction-ID: TRANSACTION-ID#1
X-Mms-Version: 1.0
To: josef.laumen@sal.siemens.de
Date: Fri, 14 Jul 2000 15:57:13 +0100
X-Mms-Status: Partly-retrieved

FIG 18

X-Mms-Content-ID (0x19)

X-Mms-Content-ID-value = Text-string | X-Mms-Content-general-form

X-Mms-Content-general-form = Value-length Text-string
\*(Parameter)
(Codierungstypen gemäß [2] und [3])

FIG 19

| Parametername | Binärer Wert des Parameternamens | Typ des Parameterwertes |
|---|---|---|
| Name als | 0x00 | Text-string (Textzeichen) |
| Type | 0x01 | Constrained-encoding (Gezwungene Code) |
| Size (Größe) | 0x02 | Integer-value (Ganze Zahl) |
| External-Link (Externer Hinweis) | 0x03 | Yes (ja) (<Octet 128>) \| No (nein) (<Octet 129>) |
| External-Link-Size (Größe des externen Hinweises) | 0x04 | Integer-value |
| Related-ID | 0x05 | Text-string |
| Original-Type (Original-Typ) | 0x06 | Constrained-encoding (Gezwungene Code) |
| Original-Size (Original-Größe) | 0x07 | Integer-value |

FIG 20

| Name | Zugew. Nummer | laufende Nummer | Bemerkung |
|---|---|---|---|
| Bcc | 0x01 | 1 | |
| Cc | 0x02 | 2 | |
| X-Mms-Content-Location | 0x03 | 3 | |
| Content-Type | 0x04 | 4 | |
| Date | 0x05 | 5 | |
| X-Mms-Delivery-Report | 0x06 | 6 | |
| X-Mms-Delivery-Time | 0x07 | 7 | |
| X-Mms-Expiry | 0x08 | 8 | |
| From | 0x09 | 9 | |
| X-Mms-Message-Class | 0x0A | 10 | |
| Message-ID | 0x0B | 11 | |
| X-Mms-Message-Type | 0x0C | 12 | Stand der Technik |
| X-Mms-MMS-Version | 0x0D | 13 | |
| X-Mms-Message-Size | 0x0E | 14 | |
| X-Mms-Priority | 0x0F | 15 | |
| X-Mms-Read-Reply | 0x10 | 16 | |
| X-Mms-Report-Allowed | 0x11 | 17 | |
| X-Mms-Response-Text | 0x12 | 18 | |
| X-Mms-Response-Status | 0x13 | 19 | |
| X-Mms-Sender-Visibility | 0x14 | 20 | |
| X-Mms-Status | 0x15 | 21 | |
| Subject | 0x16 | 22 | |
| To | 0x17 | 23 | |
| X-Mms-Transaction-Id | 0x18 | 24 | |
| X-Mms-Content-ID | 0x19 | 25 | Veränderung durch diese Erfindungsmeldung |

FIG 21A

M-Send.req

| Name | Content | Comments |
|---|---|---|
| X-Mms-Message-Type | Message-type-value= m-send-req | |
| X-Mms-Transaction-ID | Transaction-id-value | |
| X-Mms-MMS-Version | MMS-version-value | |
| Date | Date-value | |
| From | From-value | |
| To | To-value | Stand der Technik nach WAP |
| Cc | Cc-value | |
| Bcc | Bcc-value | |
| Subject | Subject-value | |
| X-Mms-Message-Class | Message-class-value | |
| X-Mms-Expiry | Expiry-value | |

FIG 21B

| Name | Content | Comments |
|---|---|---|
| X-Mms-Delivery-Time | Delivery-time-value | |
| X-Mms-Priority | Priority-value | |
| X-Mms-Content-ID | Inhalts-Identifikator | Identifikation des MM-Elements |

FIG 22

M-Modifikation.ind

| Name | Content | Comments |
|---|---|---|
| X-Mms-Message-Type | m-notification-ind | |
| X-Mms-Transaction-ID | A unique identifier | |
| X-Mms-MMS-Version | Version number | Stand der Technik nach WAP |
| From | Sender address | |
| X-Mms-Content-ID | Inhalts-Identifikator | Identifikator des MM-Elements |
| X-Mms-Message-Class | Message-class-value | |
| X-Mms-Message-Size | Size of message | |
| X-Mms-Expiry | Expiry-value | Stand der Technik nach WAP |
| X-Mms-Content-Location | Content-location-value | |

FIG 23

M-Sreq (M-UA A → M-SR):

X-Mms-Message-Type: m-send-req
X-Mms-Transaction-ID: TRANSACTION-ID#1
X-Mms-Version: 1.0
Date: Fri, 14 Jul 2000 14:12:19 +0100
From: markus.trauberg@t-online.de
To: andreas.schmidt@sal.siemens.de
Subject: Urlaubsgruesse aus Spiekeroog
X-Mms-Delivery-Report: Yes

```
X-Mms-Content-ID:  <000714.1412.1markus.trauberg >; Name =
                   "Urlaubsgruesse.txt"; External-Link-Flag = Yes;
                   External-Link-Size = 8245
X-Mms-Content-ID:  <000714.1412.2markus.trauberg >; Name = "unser Ferienhaus.jpg"
X-Mms-Content-ID:  <000714.1412.3markus.trauberg >; Name = Spiekeroog.smi"; Related-ID =
                   <000714.1412.2markus.trauberg >; Related-ID =
                   <000714.1412.4markus.trauberg >; Related-ID =
                   <000714.1412.5markus.trauberg >
X-Mms-Content-ID:  <000714.1412.4markus.trauberg >; Name = "Meeresrauschen .mp3"
X-Mms-Content-ID : <000714.1412.5markus.trauberg >; Name = "Inselbahn .mpg"
```

Content-Type: Application/vnd.wap.multipart.related: Start = <000714.1412.3markus.trauberg >
nEntries: 5
HeadersLen: XX
DataLen: XX
Content-Type: text/plain;

```
X-Mms-Content-ID: <000714.1412.1markus.trauberg >
```

Liebe Kollegen,

Schöne Grüße aus dem Urlaub. Spiekeroog ist mal wieder ganz bezaubernd.

Falls ihr auf den Geschmack kommt, findet ihr hier mehr Info: http://www.spiekeroog.de Viel Spaß noch bei der Arbeit ;-)

MfG

Markus
HeadersLen: XX
DataLen: 1265
Content-Type: image/jpeg

```
X-Mms-Content-ID: <000714.1412.2markus.trauberg >
```

...
HeadersLen: XX
DataLen: 588
Content-Type: application/smil,

```
X-Mms-Content-ID: <000714.1412.3markus.trauberg >
```

...
HeadersLen: XX
DataLen: 82345
Content-Type: audio/mp3,

```
X-Mms-Content-ID: <000714.1412.4markus.trauberg >
```

...
HeadersLen: XX
DataLen: 632564
Content-Type: video/mpeg4

```
X-Mms-Content-ID: <000714.1412.5markus.trauberg >
```

M-Nind an einen "To-Empfänger":

X-Mms-Message-Type: m-notification-ind
X-Mms-Transaction-ID: TRANSACTION-ID#2
X-Mms-Version: 1.0
From: markus.trauberg@t-online.de
X-Mms-Message-Class: Personal
X-Mms-Message-Size: XXX (Attachments + Header)
X-Mms-Expiry: 3600
X-Mms-Content-Location: www.sal.siemens.de/mns-inbox/ABCD.1234
Subject: Urlaubsgruesse aus Spiekeroog

```
X-Mms-Content-ID:<000714.1412.1markus.trauberg >; Type =
        text/plain; Name = "Urlaubsgruesse.txt"; Size = 212;
        External-Link: Yes; External-Link-Size = 8245
X-Mms-Content-ID:<000714.1412.2markus.trauberg >; Type =
        image/bmp; Name = "unser Ferienhaus.bmp"; Size =
        5863; Original-Type = image/jpeg; Original-Size = 1265
X-Mms-Content-ID:<000714.1412.3markus.trauberg >; Type =
        application/smil; Name = Spiekeroog.smi";
        Content-Size = 588; Related-ID =
        <000714.1412.2markus.trauberg >; Related-ID =
        <000714.1412.4markus.trauberg >; Related-ID =
        <000714.1412.5markus.trauberg >
X-Mms-Content-ID:<000714.1412.4markus.trauberg >; Type =
        audio/mp3 ; Name = "Meeresrauschen .mp3";
        Size = 82345
X-Mms-Content-ID :<000714.1412.5markus.trauberg >; Type =
        video/mpeg4; Name = "Inselbahn .mpg" ; Size = 632564
```

FIG 25

M-Rconf (M-SR → M-UA B):

X-Mms-Message-Type: m-retrieve-conf
X-Mms-Transaction-ID: TRANSACTION-ID#3
X-Mms-Version: 1.0
Date: Fri, 14 Jul 2000 14:12:19 +0100
From: markus.trauberg@t-online.de
To: andreas.schmidt@sal.siemens.de
X-Mms-Message-ID: MESSAGE-ID#1
Subject: Urlaubsgruesse aus Spiekeroog
X-Mms-Delivery-Report: Yes
Content-Type: Application/vnd.wap.multipart.related; Start = <000714.1412.3.markus.trauberg >
nEntries: 5
HeadersLen: XX
DataLen: XX
Content-Type: text/plain;

X-Mms-Content-ID: <000714.1412.1markus.trauberg >; Name = "Urlaubsgruesse.txt"

Liebe Kollegen,

Schöne Grüße aus dem Urlaub. Spiekeroog ist mal wieder ganz bezaubernd.

Falls ihr auf den Geschmack kommt, findet ihr hier mehr Info: http://www.spiekeroog.de Viel Spaß noch bei der Arbeit ;-)

MfG

Markus
HeadersLen: XX
DataLen: 5863
Content-Type: image/bmp

X-Mms-Content-ID: <000714.1412.2markus.trauberg >; Name =
     "unser Ferienhaus.bmp"; Original-Type = image/jpeg;
     Original-Size = 1265

...
HeadersLen: XX
DataLen: 588
Content-Type: application/smil,

X-Mms-Content-ID: <000714.1412.3markus.trauberg >; Name = Spiekeroog.smi"

...
HeadersLen: XX
DataLen: 82345
Content-Type: audio/mp3,

X-Mms-Content-ID: <000714.1412.4markus.trauberg >; Name = "Meeresrauschen .mp3"

...
HeadersLen: XX
DataLen: 632564
Content-Type: video/mpeg4,

X-Mms-Content-ID: <000714.1412.5markus.trauberg >; Name = "Inselbahn .mpg"

METHOD AND MOBILE TELECOMMUNICATIONS DEVICE FOR TRANSMITTING DATA IN A MOBILE RADIO NETWORK

BACKGROUND OF THE INVENTION

Current mobile radio networks, such as the one that operates in accordance with the GSM standard, provide only greatly restricted options for transmitting text data. Indeed, only short messages of up to around 160 characters typically can be transmitted. This facility is called SMS (Short Message Service). The person sending the data has to pay for the costs of sending these types of text message.

In future it should be possible to transmit multimedia data, particularly still or moving images with or without sound. This is likely to involve a significant expansion of volumes of data for transmission and of the data types within such transmissions which involves increased transmission time and increased costs.

An object of the present invention is therefore, to simplify the checking of data transmission for subscribers in a mobile radio network.

SUMMARY OF THE INVENTION

The method in accordance with the present invention makes it possible to send information to the data recipient about the characteristics of the data ready to be received, which makes it easy to check this data.

The advance transmission of the characteristic or characteristics of the identification signal(s) specifying the data to be transmitted makes it possible to perform the check before the actual data is received, whereby in a particularly advantageous manner the recipient is given the opportunity on the basis of the information thus received of whether they wish to receive the existing data now, later or not at all. If the option of choosing a partial receipt of a Multimedia Message (MM) is provided, the recipient can, for example, download only the short information important to them that needs a short time to transmit, wherein associated memory-intensive image items or similar could be downloaded later or even not at all.

When the identification signal used for this purpose contains information about the size of a data record to be received, the recipient can tell from this information how much time they need to receive and/or study the data and whether they wish to spend this time and now, later or not at all.

When the identification signal contains information about the name of a data record, the recipient can tell from this information from which subject area the data originates. The recipient also can select whether he/she wishes to receive this data record or these data records now, later or not at all.

Of particular advantage is the fact that information also can be given in the identification signal about the data type so that the recipient knows whether for example, this data is image data, text data and/or music data.

This decisively improves checking and transparency.

Additional features and advantages of the present invention are described in, and will be apparent from, the following Detailed Description of the Invention and the Figures.

BRIEF DESCRIPTION OF THE FIGURES

FIG. 1 a schematic diagram of send operations assigned to a data transmission in accordance with the WAP (Wireless application protocol) standard between the level of the sender and that of the provider on the one hand, and the level of the provider and that of the recipient, on the other hand.

FIG. 2 shows the header fields of a message M-Send.req sent in accordance with the WAP standard shown in FIG. 1, whereby the newly inserted header fields in accordance with the present invention are highlighted in gray, FIG. 3 shows a specification of the type of information stored in the fields shown in FIG. 2 and highlighted in gray as well as the additional field which appears in the Status Report about the receipt of the sent data.

FIG. 4 shows a diagram of the assignment of the header fields from FIG. 2 to the binary codes, whereby the newly inserted header fields in accordance with the present invention are highlighted in grey.

FIG. 5 shows a diagram similar to FIG. 2 of the message M-Notification.ind (MNI) sent in accordance with the WAP Standard shown in FIG. 1.

FIG. 6 a diagram similar to FIG. 2 of the M-Retrieve.conf (MRC) message sent in accordance with the WAP Standard shown in FIG. 1.

FIG. 7 a diagram similar to FIG. 2 of the M-Acknowledge.ind (MAI) sent in accordance with the WAP Standard shown in FIG. 1.

FIG. 8 a diagram similar to FIG. 2 of the M-Delivery.ind message sent in accordance with the WAP Standard shown in FIG. 1.

FIGS. 9-17 and 23-25 shows examples in each case of the content of different information signals for the transmission of multimedia messages between a number of components of a radio communications system in accordance with the method of the present invention.

FIG. 18 shows the encoding on a single header field name.

FIG. 19 shows the encoding of the new parameter names and parameter values in an individual header field in accordance with FIG. 9.

FIG. 20 shows the assignment of binary codes to the field names of the parameters in an individual header field in accordance with FIG. 9.

FIG. 21A, 21B show the individual header fields of a Multimedia Service (MMS) send request (in WAP Message M-Send. req.

FIG. 22 shows the header fields of the MMS recipient notification (M-Nind; in WAP Message M-Notification.ind;) of the MSreq belonging to the send inquiry in accordance FIG. 12A and 12B.

Elements and with the same function and operation are provided with the same reference numbers in FIGS. 1 and 13.

DETAILED DESCIPTION OF THE INVENTION

The exemplary embodiment describes the application of the present invention to a data transmission system 1 for the WAP standard, as would be used in the transmission of, in particular, image data and formatted text data in UMTS (Universal Mobile Telecommunication Standard). It is understood that the present invention can also be transferred to other standards.

There is provision in the UMTS, in addition to the provision of the previous SMS standard, to provide what is known as an MMS (Multimedia Messaging Service) standard for a transmission of messages as well as Multimedia messages (MMs). This allows formatted texts and images with or without sound to be transmitted as well. The restriction which exists in SMS to a message length of 160 characters does not apply. Transmission of audio and video messages is possible.

MMS can be implemented by using WAP. In this case, for radio transmission of data, such as of Multimedia Messages (MMs), the protocol scheme shown in FIG. 1 (WAP WSP: Wireless Session Protocol) is supplied. This includes a layer 2 of a data sender (also known as an MMS User Agent A), a layer 3 of a provider (of which the network element which executes the service is also known as the MMS Relay) and a layer 4 of a recipient (also known as MMS User Agent B). Layer 2 of the data sender includes at least one telecommunications device 5. Likewise, layer 4 of the recipient includes a telecommunications device 6. These telecommunications devices 5, 6 can, for example, be designed as normal handsets or as devices with a further input and display function, such as laptops.

A Multimedia message (abbreviated (MM)) entered in the telecommunications device 5 of the sender (or to be forwarded in this device) may contain one or more units (data records 7); for example, individual images, film sequences, texts or similar. The MM is initially sent as inquiry 9 (this enters in the WAP protocol the name M-Send.req) to the provider (layer 3).

From there the transmission 9 that arrives with the acknowledgement 10 (M-send.conf) is acknowledged to the sender (layer 2).

Following on from this in time, the information 11 (M-Notification.ind) is sent by the provider (layer 3) to the recipient (layer 4) with which the latter is informed that there is a message for them to download at provider (layer 3).

For this, the provider (layer 3) typically automatically receives the response 12 (M-NotifyResp.req) from the telecommunications device 6 of the recipient (layer 4).

Only on request by the recipient with the transmission 13 (WSP GET.req) is the MM with the transmission 14 (Mretrieve.com) forwarded to the recipient.

The message 15 (M-Acknowledge.ind) acknowledges the receipt of the a MM.

The concluding message 16 (M-Delivery.ind) returns a receipt acknowledgement to the sender (layer 2).

What are known as the header fields are used to administer the transmissions 9, 10, 11, 12, 14, 15, 16; that is the fields preceding the actual MM in which information about the origin, send time, file size and further details can be contained.

In accordance with the invention the number of the header fields is increased by least one further field 17, 18, 19, 20, 21, 22, 23 as information field(s) to enable the MM to be informed about characterizing parameters and to be able to send a one or identification signals for these parameters to recipient (layer 4).

In the exemplary embodiment (see FIG. 4) fields 17, 18, 19, 20, 21, 22 and 23 addressed with 0×80 to 0×86 in the hexadecimal system are provided for this purpose to accommodate the information about the parameters which are described in more detail below. A different number and/or addressing of the additional header fields is also possible.

The additionally named header fields 17, 18, 19, 20, 21, 22, 23 are at least inserted into message 11 (M-Notification.ind), with which the recipient (layer 4) is informed about the availability of an MM. The message 9 (M-Send.req) also can, if the additional parameters are generated by the sender (layer 2), contain the additional header fields 17, 18, 19, 20, 21, 22 and 23 (FIG. 2), as well as the actual MM delivery 14 (M-Retrieve.conf) (see. FIG. 5) or further messages 10, 12, 13, 15 and 16.

A data record 7 of an MM is taken below to refer to an individual component of an MM which is defined by its type (e.g. still image) and its format (e.g. JPEG), whereby in MMS there is also provision for format conversion by the MMS Relay (layer 3) which guarantees that telecommunications devices 6 of a recipient (layer 4) which only support specific formats of a type only can be operated with these formats. For example, a telecommunications device 6 only can display still images in the JPEG format, and it has notified the MMS Relay (layer 3) about this in its registration. The MMS Relay (layer 3) then converts all still images arriving for this recipient into the JPEG format, in which case the file size generally changes. This aspect is relevant for a later examination of the new header fields in accordance with this invention.

As an identification signal for example the following information can be included about a data record 7. Another amount of information, such as only a selection of that listed, can also be provided. The information is provided to the recipient of an MM optionally when the WAP Standard is used (FIG. 1) in the notification 11 (M-Notification.ind) and, thus, before transmission of the actual data in the Multimedia Message.

Possible parameters of data to be transmitted, especially of an MM, via which the recipient is informed in advance, are as follows:

1. the number of data records 7 that the MM contains (also implicitly through the description of the individual elements of the MM);

2. the relevant size (in octets) of a data record 7;

3. the relevant type and the format of a data record 7;

4. the relevant Content ID (Content Identification) of a data record 7, possibly also relative to the Content ID/Message ID of the overall MM;

5. the relevant name of a data record 7;

6. the subject of the overall MM;

7. the connection of an element to one or more other data records 7 of the MM; and 8. the connection of the overall MM or of one or more data records 7 to one or more URLs/URIs outside the MM and with an external link of this type, optionally the size of the data to be loaded of the resolved external link(s).

With the aid of the new header fields 17, 18, 19, 20, 21, 22, 23 the method of "detailed notification" can be implemented in the MMS and the convenience of the MMS for the users markedly increased. Even before an MM is loaded, and probably even before costs arise for the user, the latter is informed in detail about the contents and the composition of the MM and can act accordingly. As such, for example, he/she only downloads individual data records 7 of the MM and rejects further messages.

An MM basically consists of a header and, depending on the type of MM, a data part (WAP: Body). The header includes general information of the MM and is made up of defined header fields. The data part of the message contains one or more elements of any type (e.g. texts, images, sounds . . . ) that follow the header in any order. If the presentation description is contained in the data part, there should be what is known as the start parameter pointing to this presentation description in a WAP message at the beginning of the data part.

Each header field consists of a field name, followed by a field value which consists of at least one octet. The assignment of hexadecimal values to the field name is shown in FIG. 4.

There are basically two options for supplementing the notification 11 to the recipient (layer 4) with the desired information: either the information is created by provider (layer 3) or by sender (layer 2). A mixed form is also possible. The following individual sequences are possible for this:

The information is extracted from the MM arriving at the MMS Relay (layer 3) with message 9; i.e., is partly accepted unchanged from header fields and partly calculated from the data part of the MM (e.g. the specification of the size of a data record 7).

Of advantage with this process is the consistency to be expected between the descriptive header information of Message 11 and the actual content 14 (in WAP: MRetrieve.conf) which is transmitted at the request of the recipient (layer 4) (User Agent B) to the latter. The implementation effort at sender (layer 2) (and thereby as a rule in the mobile terminal) remains small. A further advantage exists with regard to the accuracy of the size specification when format conversion takes place. There is provision with MMS, before the data is delivered, for adaptation of the content to for example, the capabilities of the receiving MMS User Agents (layer 4) (such as supported codecs, display size of the terminal, etc.) or requirements of the recipient (such as automatic restriction to a maximum size) to be undertaken by the service provider (layer 3). MMS Relay (layer 3) can notify recipient (layer 4) of the size of the content after data adaptation. This is information that sender (layer 2) does not possess. The disadvantage is that there is additional effort at the MMS-Relay (layer 3) for generating the information for this "detailed notification," which arises here because of the necessary "parsing" of the MM and the extraction of corresponding information.

Instead, the information can already be generated by sender (layer 2) and be explicitly integrated in the header fields 17,18,19, 20, 21, 22 and 23 in message 9 to send an MM (in WAP: M-Send.req). Of advantage is the unchanged processing of the MM in MMS Relay (layer 3) that does not have to analyze the content of the MM. The implementation of the options opened up with the new header fields 17, 18, 19, 20, 21, 22 and 23 in terminal 5 can be determined by the manufacturer. There is also the option of offering terminals with additional enhanced-convenience features. Furthermore, the subscriber (layer 2) sending the MM can impart their knowledge about the internal and external linkage of the MM elements to the MM recipient in the form of detailed information which is merely forwarded by MMS-Relay (layer 3). A generation of the header fields in the MMS Relay (layer 3) which requires knowledge of the internal and external linkage of data records 7 would only possible there by using expensive parsing of the MM. A disadvantage is the expansion of header fields with information which is redundant in some cases.

Advantageously, therefore, the information is partly generated in the sending User Agent (layer 2) and partly in MMS Relay (layer 3), which, on the MMS Relay (layer 3) side, also requires the updating of existing header fields generated by sender (layer 2).

For this mixed form of the generation of additional information, the information explained below can be divided up as follows:

Generation in the sending User Agent 2:

X-Mms-Content-ID: In the current WAP specification there are no options for assigning individual additional header fields to data records 7 (e.g., with relevant name and type) and for assigning a number of data records 7 hierarchically. For a transparent conversion of an MM into an Internet mail (format as per RFC 822 with extensions in accordance with MIME (Multipurpose Internet Mail Extensions)) the following requirements are proposed: The information possibly encoded in the data part of the e-mail for each extension of an e-mail (name, type, . . . ) is also contained transparently in an MM. A Content-ID in the header of the MM which is uniquely assigned to each data record 7 can be used as a reference. The start parameter in the message body (data structure section which contains actual notification information) must be defined as a field that contains the Content-ID (=content identifier) CI of the presentation description object and thereby enables this object to be accessed. With these agreements, a transparent transmission of an MM from an MMS Relay to any recipient both directly via another MMS relay as well as over the internet via e-mail is possible. A unique assignment to the data record or the data records 7 in the MM is a vital necessity for the first transmission from the sending User Agent (layer 2) to MMS Relay (layer 3).

X-Mms-Content-Type: Designates the type and the format of the data record 7. These already should be entered on sending since data record 7 does not absolutely receive a file name such as in an e-mail and can then not be assigned to a format via a file extension. This field only needs to be updated by MMS Relay (layer 3) for a format and/or type conversion. The X-Mms-Content-Type is displayed and identified by the value of the signal CTV.

X-Mms-content-Size: Size of the data record 7. This is displayed and identified by value or content CSV.

X-Mms-Content-Name: Name of the data record 7. This name is only known to the sending User Agent (layer 2) and, therefore, must be used by the latter. It is assigned the content CNV.

X-Mms-External-Link-Flag: indicates that data record 7 has a link to contents outside the MM. When this information is used by the sending User Agent (layer 2), an analysis of the content of data record 7 by the MMS Relay (layer 3) can be dispensed with. The value or the character string ELF is assigned to it as contents.

X-Mms-External-Link-Size: This specifies the size of linked content outside the MM. This is indicated by the content ELS. Since the data scope of an internal content cannot be read from link itself, this information is of great interest for a user. It can be created directly on generation of the MM in the sending MMS User Agent (layer 2). Alternatively generation by the MMS-Relay (layer 3) is possible, but in addition to the analysis of the entire MM also requires access to the object listed in the reference to determine size.

X-Mms-Content-Related-URI: The information CRV of this field specifies the location of another element to which data record 7 refers. For example, a data record 7 as a presentation description which refers to other elements with audio, video or other content of the MM. The generation of this information requires, on the one hand, knowledge about the internal references of the elements of an MM which is present on the side of the sending MMS User Agent (layer 2) and, on the other hand, knowledge relating to the positions of the MM elements for MMS-Relay/Server (layer 3) or at recipient (layer 4). The information can be encoded on the sending MMS User Agent (layer 2) side in header fields and is to be corrected/updated by MMS-Relay (layer 3) on the basis of the then current positions and is subsequently to be evaluated in the receiving MMS User Agent (layer 4).

Generation or updating in MMS Relay (layer 3):

X-Mms-Content-ID: Is adapted by the MMS Relay (layer 3) when the Content ID changes.

X-Mms-Content-Type: If the MMS Relay (layer 3) changes the type and/or the format of a data record 7, the Content Type is updated accordingly.

X-Mms-Content-Size: Size of the data record 7, specified in octets. Only if the MMS Relay (layer 3) changes the type and/or format of the data record 7 is the information relating to the content size updated.

With the differentiated information which a user (layer 4) has received with the message 11 (WAP: M-Notification.ind), access to individual data records 7 is possible via the selection switch 25 which is typically implemented on the software side in a menu and operated via an input, such as a keyboard. Thus, a partial download can be initiated by a download request with the Content ID of a relevant required data record 7 (for example, of a photo without simultaneous transmission of the accompanying text) in WAP with command 13: WSP GET.req.

To enable this to be done, the basic problem to be resolved is that the additional header fields must under some circumstances be used a number of times in an MM (WAP: e.g. X-Mms-Content-Name for each data record 7 of the MM). If there are a number of header fields in a content relationship, as is the case for the description of a data record, a syntactical assignment must be defined.

Basically, in the WAP Standard, the sequence of the header fields is of no significance. A change of the sequence of information name, size, type and/or URI of a number of data records 7 thus cause a change or corruption of the description of data record 7 if the assignment of the information was to be made dependent on the sequence of the header elements, which is the only viable way since there is no provision for a hierarchical structure of the header elements in WAP.

On the other hand, the statement about the irrelevance of the header element sequence contradicts the statement that HTTP headers which include lists of to be converted into a number of WSP headers each with only a single element, in which case the sequence of the entries should be retained. To resolve this contradiction, a system will be designed for which a requirement is the significance of the sequence of header elements.

To restrict the descriptions of individual data records 7, a defined header field must begin the description of a data record 7 to which all subsequent header fields are assigned until either the end of the header of the message is reached or a next header field of the defined type marks the beginning of the description of further data record 7.

Field 17: X-Mms-Content-ID serves as a defined header field for the description of a data record 7, since it contains the unique address of the element. The description of a data record 7 is basically initiated by this field, after which the other fields can appear optionally and in any sequence.

As an alternative to the system with unique markers for the message elements the Content-IDs and the corresponding references in the header, it is also possible to have a system which operates by specifying an offset to the described data record in the data part of the MM. The disadvantage here, however, is the danger of not calculating the offset correctly or of not adapting it correctly for a possible format conversion in MMS Relay (layer 3). Another disadvantage is the lack of an option for establishing a logical relationship between a description of a data record 7 in the notification 11 and in the actual transmission 14 of the MM. The information must then be contained once more in the Multimedia Message delivered.

The sender (layer 2) can activate an input facility implemented by hardware or, in particular, by software and operated via the keyboard which is always available at their telecommunications device 5 to enable them to store in the header fields 17, 18, 19, 20, 21, 22 and 23 the additional information or a part of this information (see above). This will be sent as a component of an identification signal for one or more data records 7 of the MM with the transmission 9 (in WAP: M-Send.req) (FIG. 1) to the provider (layer 3). The send confirmation by the MMS-Relay (layer 3) (in WAP with message 10: M-Send.conf) remains unchanged since the only essential information is the message ID issued optionally by the MMS-Relay (layer 3).

The recipient (layer 4) then receives message 11 (in WAP M-Notification.ind) indicating that there is an MM for him/her with one or more data records 7 for downloading. This notification 11 in its turn contains all additional header fields 17, 18, 19, 20, 21, 22 and 23 to describe the data record 7 from the header of message 9 for sending the message (in WAP: M-Send.req). This information can be notified to the recipient visually (via display means 24, for example) or audibly.

The response 12 (WAP: M-NotifyResp.ind) confirming receipt of notification 11 remains unchanged.

After the recipient (layer 4) of the MM is given detailed information about its contents, he/she can download the entire MM (in WAP: by command 13: WSP Get.req). Alternatively, access to an individual element of the MM is also possible. For this purpose, for example, the content ID of a data record 7 of the MM is used as a URI in the command for download. Without the agreement of the recipient (layer 4) downloading of the MM (sending a transmission 14 to the recipient) is not enabled. It is also possible that the recipient (layer 4) only wishes to receive the MM at the later, cheaper point in time.

The actual data transmission 14 can contain the descriptive header fields 17, 18, 19, 20, 21, 22 and 23. This is not mandatory, however, as shown in FIG. 7.

Finally, the MMS-Relay (layer 3), if the sender (layer 2) so desires, sends the report 16 about the status of the delivery of the MM (in WAP: M-Delivery.ind) to the latter. As well as the options already known, "Expired", "Retrieved", "Rejected", "Deferred", "Partly-retrieved" also can occur in the status field. In accordance with the invention, the indicator shows which data record 7 was retrieved. The corresponding section of message 16 could be as follows:

>>>>>
7.2.22 Status field
Status-
value=Expired|Retrieved|Rejected|Deferred|Partly-retrieved Expired =<Octet 128>
Retrieved=<Octet 129>
Rejected=<Octet 130>
Deferred=<Octet 131>
Partly-retrieved=<Octet 132>
<<<<<

Fields 22, 23 X-Mms-External-Link-Flag (optional) and X-Mms-External-Link-Size (optional) which are also new can display the links and contained in the MM to content outside the MM in the messages 9 or sending the MM (WAP: MSend.req) and in the message 11 the recipient (layer 4) (WAP; MNotification.ind). Depending on its position in the MM header field, 22: X-Mms-External-Link-Flag is specified as a link to external contents within the entire MM or within a specific data record 7 of the MM. Field 23: X-Mms-External-Link-Size optionally describes the size of the content in octets. This allows the recipient of the notification to already estimate the volume of data in addition to the MM itself that is still to be downloaded.

The procedure presented can be integrated into software for operating the relevant communications standards, such as UMTS. The telecommunications devices 5,6 are then provided with corresponding software.

Illustrated below is a concrete sequence according to the invention of the transfer of an MM as per the WAP standard (FIG. 1):

The following typical scenario is assumed: The sender (layer 2) (Markus Trauberg) sends an MM with the text with the number of data records 7, namely an MP3 audio, a JPEG image, an MPEG-4 video and an 5MIL-presentation description to two recipients (layer 4) (Andreas Schmidt and Josef Laumen). For convenient and differentiated use by the recipient (layer 4), he inserts descriptions of parameters of the data records 7 of the MM in their header. The data is transferred in the messages 9 (M-Send.req) and 11 (M-Notification.ind) to the recipients. Recipient (layer 4) Andreas Schmidt loads the complete MM onto his terminal 6, whereas recipient (layer 4) Josef Laumen is only interested in the text and only loads this onto his terminal 6. The following MMs will be transferred between the units:

MM is sent to two addressees. The message protocol can then be depicted as shown in FIG. 9.

In the MM, the additional information blocks about the MM elements are encoded into the header. The relationships between the data record 7 of the MM are also described in the header: Thus, the description of the presentation description contains references to the external elements within it, Image/jpeg, audio/mp3 and video/mpeg4 in the form of a corresponding Content IDs.

The description of the text contains the information that a reference to an external object is included, comprising 8245 bytes of data.

The above send request 9 (MSend.req) of sender (layer 2) is confirmed with message 10 (MSend.conf) from MMS Relay (layer 3). This message 10 does not contain any additional new fields as can be seen from its subsequent version, which is depicted in FIG. 10.

The MMS Relay (layer 3) confirms with message 10 that request 9 has been transmitted error-free to MMS Relay (layer 3). Transaction-ID#1 is used to uniquely assign message 10 at sender (layer 2) to the associated request 9 (M-Send.req) and thereby to the sent MM. Because a delivery report was requested in message 9 in field X-Mms-Delivery-Report, MMS Relay (layer 3) of the MM assigns a Message-ID and transfers this here to sender (layer 2).

Message 11 is subsequently transferred to the recipient (layer 4):

M-Notification.ind (MMS Relay~MMS User Agent B):

There is provision in MMS for informing a recipient of an MM about new messages that are available for them. Message 11 (M-Notification.ind) serves to notify the addressee about the MM available for download. Consequently, in this example, there exist two notifications to recipients Andreas Schmidt and Josef Laumen. Each includes its own Transaction-ID. The information about the memory location of the MM is in the field X-Mms-Content-Location in both of the notifications.

FIG. 11 reflects the typical content of M-Notification-ind.

As well as the normal fields that the beginning of Message 11, all descriptive elements of message 9 can now be transferred to message 11. In addition, as described above using the mixed form, MMS Relay (layer 3) also generates the information X-Mms-Content-Type and X-Mms-Content-Size from the information of the body of message 9. The recipient (layer 4) knows after receiving message 11 both the address of the MM (as previously) as well as the composition from the individual data records 7 and their content IDs. Access to separate data records 7 of the MM is, thus also possible.

The correct receipt of the notification is subsequently confirmed by the recipient (layer 4) of the MM with message 12 (MNotifyResp.ind) by the corresponding transaction ID of Message 11 together with a status message being returned to MMS Relay (layer 3).

The download of the MM is initiated by command 13 (WSP GET.req). The MM is then sent by MMS Relay (layer 3) in message 14 (M-Retrieve.conf) to recipient (layer 4).

Since the information about the individual elements was already transferred with message 11, the download of the entire MM can be undertaken as previously with message 14 without additional fields having to be inserted into the header of this message 14. The additional information in the headers of the individual data records 7 on the other hand, also should be contained in Message 14 since they contain important information about the MM data records 7.

Shown below are two possible typical reactions of recipient (layer 4):

Recipient Andreas Schmidt loads the entire MM.

Recipient Josef Laumen only loads the text part of the MM onto his terminal 6.

In the first case Message 14 is encoded as depicted in FIG. 12:

The recipient (layer 4) Andreas Schmidt confirms the successful receipt of the MM with subsequent message 15 (M-Acknowledge.ind). The Transaction-ID contained in the message allows assignment to the sent MM in accordance with the information signal M-Acknowledge.ind from FIG. 13 at MMS Relay (layer 3).

As a last step of the transaction, message 16 (M-Delivery.ind) is finally delivered from MMS Relay (layer 3) to sender (layer 2) in accordance with FIG. 14:

The second recipient (layer 4) Josef Laumen, on the other hand, decides to only load the text part of Message 14. To do this he uses the Content ID of the text part in message 13 (WSP GET.req): "000714.1412.1markus.trauberg". He receives this text part with message 14 (M-Retrieve.conf) which, unlike the version to Andreas Schmidt, is clearly changed and of which the typical content is shown in FIG. 15.

Message 14, compared to its complete version, as was sent to Andreas Schmidt, is reduced by the data records 7 that are not required. In addition, the field nEntries has been adapted accordingly.

Message 15 (M-Acknowledge.ind), which is shown in FIG. 16, corresponds almost completely to the version sent to Andreas Schmidt, but contains a separate Transaction-ID.

As the last stage, sender (layer 2) is again notified about the status of the delivery. The message contains the status of the partial delivery ("Partly-retrieved") and its contents are shown in FIG. 17.

As well as the previously-described options for detailed notification of recipients of multimedia messages (MMs) in the Multimedia Messaging Service (MMS) there is a further useful option that has advantages over the variants already presented. This advantageous option is described below.

The core of this modification is the realization of the idea of informing the relevant recipient in detail about the contents of the corresponding MM, in which case only a single newly-defined header field is used, for which new parameters will be introduced. The new header field in this case contains all parameters; i.e., information about the element of the MM to be described. Element or data record of an MM refers to an individual component of an MM which is defined especially by its type (e.g., still image) and by its format (e.g., JPEG (=Joint photographics expert group)).

The following list contains the information already proposed for the previous variants which can be made available to the recipient of an MM optionally in a recipient notification in MMS (M-Nind; in WAP: M-Notification.ind). This includes:

the number of elements that the MM contains (also implicitly through the description of the individual elements of the MM);

the size (in octets) of an element;

the type and the format of an element;

the Content ID (Content Identification) of an element (=Name or identifier of the relevant header field of the relevant identification signal);

the name of an element;

the connection of a element to one or more other elements of the MM; and the connection of the entire MM or of one/a number of elements to one or more URLs/URIS (uniform resource link/identifier) outside the MM and for such an external reference optionally the size of the objects of the resolved external reference(s) to be loaded.

The definition of the corresponding header fields for the optional expansion of the MMS recipient notification (M-Nind; in WAP: M-Notification.ind) and, where necessary, also the send request (M-Sreq; in WAP: M-Send.req) and the MMS delivery confirmation (M-Rconf; in WAP: M-Retrieve.conf) are described in the subsequent exemplary embodiment.

An MM basically consists, as shown in the previous exemplary embodiments, of a header and, depending on the type of message, if necessary a data part (WAP: Body) as well. A header comprises general information of the message and is made up of one or more defined header fields. Any data part of the message contains one or more elements of any given type which follow the header in any given sequence. If a presentation description is contained in the data part, what is known as the start parameter should preferably refer to this presentation description at the beginning of the data part; in a WAP message, for example.

FIG. 1 shows a message flow diagram of the basic sequence of a transmission of a message from the user application of the sending user (layer 2) (User Agent A=M-UA_A) to the MMS connection unit and (layer 3) (MMS Relay=M-SR) to the user application of the receiving user (layer 4) (User Agent B=M-UA_B)

The header fields in a WAP which are possible or required depending on the message type are shown for the message types here in the tables corresponding to FIGS. 21A/21B und 22. These have been taken from WAP-209-MMSEncapsulation, Release 2000; Wireless Application Protocol; WAP Multimedia Messaging Service; Message Encapsulation; MMS Proposed SCD 1.0. According to WAP-203-WSP, Version 4-May-2000; Wireless Application Protocol, Wireless Session Protocol Specification; Chapter 8.4: "Header Encoding"each header field consists of a field, followed by a field value which consists of at least one octet. The assignment of hexadecimal values to the field names of the WAP Message is shown in the table corresponding to FIG. 20.

This further option is based on me definition of a header field for unique identification of an element of an MM introduced for the previous exemplary embodiments, the header field X-Mms-Content-ID, that in the body of the MM precedes the element of the MM as a header field and uniquely identifies the element.

The description of an element of the MM here differs from the previous proposals in that it is based on a single header field X-Mms-Content-ID that is integrated into the header of the MM to notify the recipient and that the necessary information (for the notification of the recipient, e.g., about number, type, size, and format of the data records of the MM provided for them) is described by one or more parameters from the following list:

Name describes the name of the MM element;

Type describes the type and the format of the MM element;

Size describes the size of the MM element in bytes;

External-Link indicates that the element includes a link to content outside the MM;

External-Link-Size specifies how much data additionally must be downloaded to resolve the external reference; and Related-ID specifies which element of the MM is related to the element and that a partial download of the MM (multiple use possible) should occur.

Thus, expressed in general terms, the identification signal for one or more assigned data records is transmitted encoded in a single additional header field from the relevant sender such as, for example, a first mobile radio device and/or relevant server in an MMS recipient notification to the recipient such as, for example, a second mobile radio device. This avoids right from the start sequencing and assignment problems such as could occur with the use of a number of header fields between these fields themselves and/or the assigned data records.

Furthermore, in addition to the information already described for the previous exemplary embodiments, the following information should be able to be encoded as parameters:

1. Original-Type describes the type of MM element before the transcoding by the MMS relay (MSR); and 2. Original-Size describes the size of the MM element before transcoding by the MMS relay (MSR) in bytes.

Combining all the relevant information for an MM element into a single header field removes the need to adhere to the header sequence as is required with the previous exemplary embodiments.

FIG. 18 shows the newly introduced header field for the purposes of detailed notification of the recipient of an MM in accordance with WAP, including the encoding of field name and field value. The Table according to FIG. 20 contains the assignment of hexadecimal values to the field name. The table in accordance with FIG. 19 contains the assignment of hexadecimal values to the parameter names and furthermore the types to be used for encoding the parameter values. The messages as expanded by the corresponding header fields are listed in Tables 21A/21B and 22. All changes and expansions to the prior art in the tables are enclosed within a frame.

Exemplary Embodiment

In the exemplary embodiment which now follows, which is based on the definition of the described messages by the WAP Forum, there is a detailed examination of the header fields used in the WAP messages. The embodiment assumes the following example scenario: M-UA A (Markus Trauberg) sends a Multimedia Message $MM_A$ consisting of a text, an MP3 audio, a JPEG image, an MPEG-4 video and an SMIL (synchronized multimedia Integration language) presentation description to a recipient M-UA_B (Andreas Schmidt). For convenient and differentiated use by the recipient descriptions of the elements of the MM are added to the MM header in accordance with this present invention. The data is transferred in messages M-Sreq and M-Nind to the recipient. Recipient Andreas Schmidt loads the complete MM onto his terminal. The following messages are transmitted between the units.

$MM_A$ is sent to an addressee. Its content is depicted by way of example in FIG. 23.

The additional information blocks (i.e., in general terms, the one or more parameters about the MM elements) are encoded into the message. In these blocks the relationships between the elements of the MM are also described. Thus, the description contains the presentation description (*.smil) pointers to the elements referenced within it Image/jpeg, audio/mp3 and video/mpeg4 in the form of the corresponding Content-IDs.

The description of the text contains the information that a pointer to an external object which comprises 8245 bytes of data is included.

According to the prior art the send request (WAP: M-Send.req) of MMS User Agent A will be confirmed with a message (in WAP:M-Send.conf) from M-SR. This message is not modified as part of this EM and, thus, not listed here.

M-Nind (M-SR->M-UA-B)

In MMS (multimedia services) corresponding to 3G TS 23.140 version 3.0.1, Release 1999; Third Generation Partnership Project; Technical Specification Group Terminals; Multimedia Messaging Service (MMS); Functional Description; Stage~2 und WAP-209 MMSEncapsulation, Release 2000; Wireless Application Protocol WAP Multimedia Messaging Service; Message Encapsulation; MMS Proposed SCD 1.0 there is provision for informing a recipient of an MM about new messages that are available for them. The message M-Nind (in WAP: M-Notification.ind) serves to notify the addressee about MMs that are ready for them to download. Their typical content is depicted in FIG. 24. There therefore exists in this example a recipient notification to recipient Andreas Schmidt. The information about the memory location of $MMA_A$ is in field X-Mms-Content-Location here.

As well as the usual fields at the beginning of the message all descriptive elements of message M-Sreq that are new for this variant can be transferred into message M-Nind. In addition the M-SR also generates the information type and size from the information of the body of message M-Sreq or the image of type image/jpeg that it contains is converted into the type image/bmp since the terminal cannot display JPEG images. The corresponding information about the original type and the original size have been supplemented in the corresponding header field. The recipient knows after receiving the detailed notification both the address of the MM (as previously) and the composition of the individual elements and their Content-IDs. An access is, thus, possible separately to the individual elements of the MM.

The correct receipt of the notification subsequently can be confirmed by the recipient of $MM_A$ with the message M-NRind, by returning of the corresponding Transaction-ID of the M-Nind together with a status report to the MMS Relay. The downloading of $MM_A$ is then initiated by the command W-Greq. The MM then will be sent by MS-R in the message M-Rconf to MM-UA A.

Subsequently, the message will be completely downloaded by the recipient Andreas Schmidt onto his terminal. The message M-Rconf is, for example, encoded as depicted in FIG. 25.

Recipient M-UA B subsequently confirms the successful receipt of $MM_A$, in accordance with the prior art, with message.

Viewed in overall terms, this provides a procedure for transmitting additional information for detailed description of a Multimedia Message and the MM elements contained within it in the Multimedia-Messaging-Service (MMS). This information is transmitted with the individual or a number of additional header fields in the relevant MMS recipient notification by the server responsible as M-SR to the receiving User Agent. The necessary information is preferably generated by the sending User Agent and transferred to the server responsible encoded by the latter in the MMS send request. In addition to this or independently, the information needed also can be extracted by the responsible switching/provision server from the data part of the relevant MM to be sent and transmitted encoded to the receiving User Agent in the MMS recipient notification. Preferably, one or more of the following items of information about the content or individual elements of the content of the message which is, for example, ready for delivery in the Server responsible can be notified to the receiving User Agent:
  number of elements contained in the MM;
  size of the element of the MM (in octets);
  Type format of the element of the MM;
  identification of the element (Content-ID or URI);
  Name of the element;
  the connection of one or more elements to one or more other elements within the MM (e.g. between presentation description and presentation element);
  the connection of one or more elements to content of any nature outside the MM (e.g., to HTML/GHTML pages);
  the relevant size of the linked external elements (in octets) that can be loaded in addition to the MM itself;
  the type and the format of the element before transcoding by the M-SR; and
  the size of the element before Trans coding by the M-SR (in octets).

The identification of the element (Content-ID or URI) in particular forms the first entry in the individual header field or the content of the first header fields if the number of header fields are used per element or data record.

The description of an element of an MM preferably can be executed with an individual field in each case which uses a unique identification number identifier or to point to the element in the data part of the Multimedia message and which also contains the further information as parameters and not in separate header fields.

The recipient of an MM preferably also can, after he/she has received a detailed Notification, load only individual elements of the MM onto his/her terminal. In just the same way it is also possible that the additional information of the MMS recipient notification in accordance with this invention (M-Nind) is also expanded in the header of the MMS delivery message (M-Rconf). Preferably, the additional header fields, if only a single header field is used per data record, can be encoded in WAP as follows:

Coding of the field named X-Mms-Content-ID in range of values between 00X00 and OX7F, especially as 0×19 in accordance with the table shown in FIG. 20.

Encoding of the field value of X-Mms-Content-ID in accordance with FIG. 9.

The information as parameters in this single header field can be encoded in accordance with the table shown in FIG. 19.

Although the present invention has been described with reference to specific embodiments, those of skill in the art will recognize that changes may be made thereto without departing from the spirit and scope of the present invention as set forth in the hereafter appended claims.

Background information about WAP and MMS, particularly the relevant literature concerning the standards, may be obtained from the following sources:

[1] 3G TS 23.140 version 3.0.1, Release 1999; Third Generation Partnership Project; Technical Specification Group Terminals; Multimedia Messaging Service (MMS); Functional Description; Stage 2

[2] WAP-209-MMS Encapsulation, Release 2000; Wireless Application Protocol; WAP Multimedia Messaging Service; Message Encapsulation; MMS Proposed SCD 1.0

[3] WAP-203-WSP, Version 4-May-2000; Wireless Application Protocol, Wireless Session Protocol Specification; Chapter 8.4: "Header Encoding".

[4] WAP-Forum:"WAP MMS Interworking with Internet Email; WAP-207-MmsInetInterworking"; Draft Version 01-Jun.-2000.

[5] 3G TS 22.140 v.4.0.1 (July 2000): 3rd Generation Partnership Project; Technical Specification Group Services and System Aspects; Service Aspects; Stage 1 Multimedia Messaging Service.

[6] RFC822: "Standard for the Format of ARPA Internet Text Messages", Crocker D., August 1982.
URL: ftp://ftp.isi.edu/in-notes/rfc822.txt.

[7] RFC2045: "Multipurpose Internet Mail Extensions (MIME) Part One: Format of Internet Message Bodies", Freed N., November 1996. URL: ftp://ftp.isi.edu/in-notes/rfc2045.txt.

[8] RFC2046: "Multipurpose Internet Mail Extensions (MIME) Part Two: Media Types", Freed N., November 1996. URL: ftp://ftp.isi.edu/in-notes/rfc2046.txt.

[9] RFC2047: "MIME (Multipurpose Internet Mail Extensions) Part Three: Message Header Extensions for NonASCII Text", Moore K., November 1996.
URL: ftp://ftp.isi.edu/in-notes/rfc2047.txt.

The invention claimed is:

1. A method of transmitting a multimedia message according to MMS protocol in a mobile radio network, the MMS multimedia message containing several components in the form of data records defined by their type and format, the method comprising the steps of:
assigning at least one identification signal for at least one of the data records;
transmitting the at least one identification signal to a receiving device of the MMS multimedia message, the identification signal containing information about a link with at least one of the data records within the MMS multimedia message, but does not contain the link itself, the link being unknown to the receiving device;
selecting or receiving a selection of at least one of the data records at the receiving device, considering the at least one identification signal containing the information about the link that is unknown to the receiving device; and
transmitting the at least one selected data record of the MMS multimedia message to the receiving device.

2. A method of transmitting an MMS multimedia message in a mobile radio network as claimed in claim 1, wherein the at least one identification signal is being indicated in a manner which is at least one of visual and audible.

3. A method of transmitting an MMS multimedia message in a mobile radio network as claimed in claim 1, wherein the identification signal contains information about a type of at least one of the data records, including a data format.

4. A method of transmitting an MMS multimedia message in a mobile radio network as claimed in claim 1, wherein the identification signal contains information about a name of at least one of the data records.

5. A method of transmitting an MMS multimedia message in a mobile radio network as claimed in claim 1, wherein the identification signal contains information about a content of at least one of the data records.

6. A method of transmitting an MMS multimedia message in a mobile radio network as claimed in claim 1, wherein the identification signal contains information about a size of at least one of the data records.

7. A method of transmitting an MMS multimedia message in a mobile radio network as claimed in claim 1, wherein the identification signal contains information about a number of data records within the transmitted MMS multimedia message.

8. A method of transmitting an MMS multimedia message in a mobile radio network as claimed in claim 1, wherein the identification signal further contains information about a link with at least one of the data records outside the transmitted MMS multimedia message.

9. A method of transmitting an MMS multimedia message in a mobile radio network as claimed in claim 1, wherein the identification signal contains information about a size of the at least one data record to which a transmitted data record is linked.

10. A method of transmitting an MMS multimedia message in a mobile radio network as claimed in claim 8, wherein the identification signal contains information about a size of the at least one data record to which a transmitted data record is linked.

11. A method of transmitting an MMS multimedia message in a mobile radio network as claimed in claim 1, wherein the identification signal contains information about an identification of at least one of the data records.

12. A method of transmitting an MMS multimedia message in a mobile radio network as claimed in claim 1, wherein the transmitted MMS multimedia message are Mobile Messages.

13. A method of transmitting an MMS multimedia message in a mobile radio network as claimed in claim 1, wherein at least one of UMTS, GSM, GPRS and EDGE transmission standards is used in the mobile radio network.

14. A method of transmitting an MMS multimedia message in a mobile radio network as claimed in claim 1, wherein at least one of the identification signals is assigned to at least one header field of the transmitted MMS multimedia message.

15. A method of transmitting an MMS multimedia message in a mobile radio network as claimed in claim 1, wherein the at least one identification signal is stored in at least one additional header field.

16. A method of transmitting an MMS multimedia message in a mobile radio network as claimed in claim 1, wherein the at least one identification signal is at least partly generated by a sender and is transmitted on transmission of an MMS multimedia message from the sender to a service provider.

17. A method of transmitting an MMS multimedia message in a mobile radio network as claimed in claim 16, wherein the sender generates at least one header field from X-MMS-Content-ID, X-MMS-Content-Name, X-MMS-Content-Type, XNINIS-External-Link-Flag and X-MMS-External-link-Size.

18. A method of transmitting an MMS multimedia message in a mobile radio network as claimed in claim 16, wherein the at least one identification signal is generated at least in part from the data record the at least one identification signal is assigned to be received from the service provider.

19. A method of transmitting an MMS multimedia message in a mobile radio network as claimed in claim 18, wherein the service provider generates or updates at least one header field from X-MMS-Content-ID, X-MMS-Content-Size, and X-MMS-Content-Type.

20. A method of transmitting an MMS multimedia message in a mobile radio network as claimed in claim 16, wherein the at least one identification signal is transmitted in the notification to the receiving device by the service provider about a presence of at least one new data record of an MMS multimedia message.

21. A method of transmitting an MMS multimedia message in a mobile radio network as claimed in claim 16, wherein the receiving device is assigned to a selection facility through which the selection facility, after at least partly noting the at least one identification signal, gives a confirmation that it is ready to receive a message and that transmission to the receiving device is not enabled until after the selection facility has been initiated.

22. A method of transmitting an MMS multimedia message in a mobile radio network as claimed in claim 21, wherein the readiness to receive only relates to a part of the at least one data record and that transmission of only the part of the at least one data record is enabled.

23. A method of transmitting an MMS multimedia message in a mobile radio network as claimed in claim 16, wherein the identification signal is added to a notification about availability of the MMS multimedia message and of actual MMS multimedia message transmission.

24. A method of transmitting an MMS multimedia message in a mobile radio network as claimed in claim 22, wherein the readiness for at least partial receipt of the available MMS multimedia message is assigned to a message WSP Get.req sent by the receiving device to the provider.

25. A mobile telecommunications device for receiving a multimedia message according to MMS protocol in a mobile radio network, the MMS multimedia message containing several components in the form of data records defined by their type and format, the receiving device comprising:
  parts for receiving at least one identification signal and the data records, wherein the at least one identification signal is assigned to at least one of the data records, and wherein the at least one identification signal is transmitted before transmission of the data records with the identification signal being indicated at the mobile telecommunications device in a manner which is at least one of visual and audible, the identification signal containing information about a link with at least one of the data records within the MMS multimedia message, but does not contain the link itself, the link being unknown to the receiving device; and
  a selection switch for enabling a user of the receiving device considering the at least one identification signal containing the information about the link that is unknown to the receiving device, to select which at least one of the data records is to be transmitted.

26. A mobile telecommunications device as claimed in claim 25, further comprising a display for the at least one of visual and audible indication of the identification signal at the mobile telecommunications device.

27. A mobile telecommunications device as claimed in claim 25, wherein the selection switch is implemented via software and is selected via an input.

28. A mobile telecommunications device as claimed in claim 25, wherein the mobile telecommunications device is assigned software for occupying a plurality of header fields of data transmissions with at least one identification signal.

29. A computer program product including a computer-readable medium encoded with executable instructions that when executed by a computer perform steps for transmitting a multimedia message according to MMS protocol in a mobile radio network, the MMS multimedia message containing several components in the form of data records defined by their type and format, the steps comprising:
  assigning an identification signal for at least one of the data records;
  forwarding to a respective receiving device of the MMS multimedia message, within a data transmission in a mobile radio network, the at least one identification signal, the identification signal containing information about a link with at least one of the data records within the MMS multimedia message, but does not contain the link itself, the link being unknown to the recipient.

30. A computer program product as claimed in claim 29, wherein the identification signal is transmitted before transmission of the respectively associated at least one data record, with the identification signal being indicated to the respective receiving device in a manner which is at least one of visual and audible.

31. A radio communications system, comprising:
  a mobile radio network for transmitting a multimedia message according to MMS protocol, the data containing several components in the form of data records defined by their type and format;
  a computer for assigning at least one identification signal for the data records, and for transmitting the at least one identification signal to a receiving device of the MMS multimedia message, with the identification signal being transmitted before transmission of the data records; and
  wherein the at least one identification signal is indicated in a manner which is at least one of visual and audible at the mobile telecommunications receiving device, the identification signal containing information about a link with at least one of the data records within the MMS multimedia message, but does not contain the link itself, the link being unknown to the receiving device, and
  wherein the receiving device includes an interface to receive from a user, in response to receiving the at least one identification signal containing the information about the link that is unknown to the mobile telecommunications receiving device, a selection of at least one of the data records is to be transmitted.

* * * * *